UNITED STATES PATENT OFFICE.

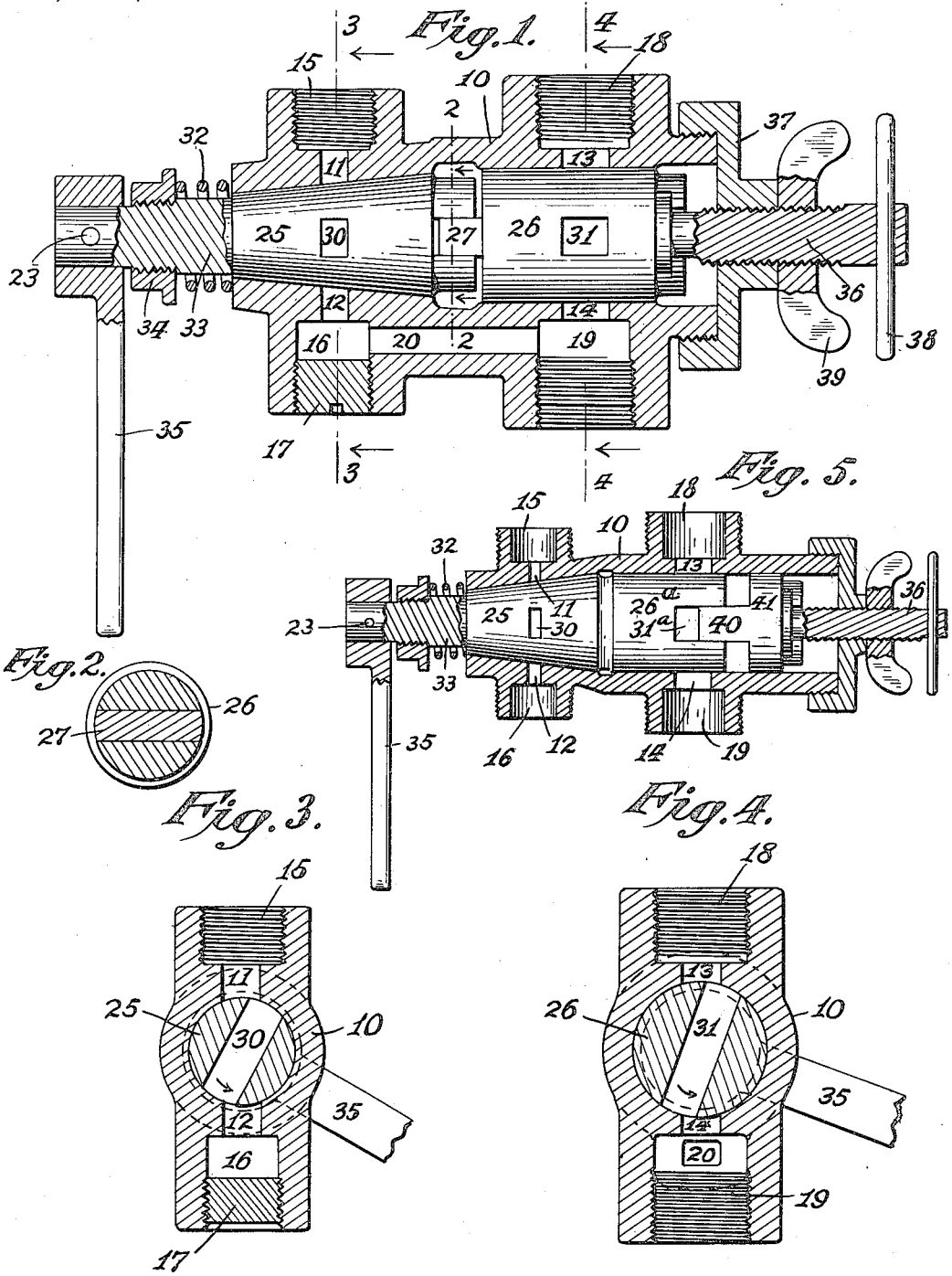

FRANK CREELMAN, OF NEW YORK, N. Y., ASSIGNOR TO GAS AND OIL COMBUSTION COMPANY, OF NEW YORK, N. Y., A CORPORATION OF DELAWARE.

VALVE.

1,175,881.

Specification of Letters Patent.  Patented Mar. 14, 1916.

Application filed April 1, 1913. Serial No. 758,196.

*To all whom it may concern:*

Be it known that I, FRANK CREELMAN, a citizen of the United States, residing at New York city, in the county of New York and State of New York, have invented certain new and useful Improvements in Valves, fully described and represented in the following specification and the accompanying drawings, forming a part of the same.

This invention relates to valves; and it has to do with a valve suitable especially for use as a mixing or proportioning valve and comprising in a typical embodiment of the invention a valve body or casing having fluid admission and discharge ports arranged in pairs for the passage of different fluids and controlled by valve members which are simultaneously operable to open and close said pairs of ports, one of said valve members being designed particularly to prevent leakage at the pair of ports controlled thereby, while another of said valve members is arranged for independent port-adjusting movement to vary to any desired extent the effective area of the ports controlled thereby, whereby the relative proportions of the different fluids passing through the several sets or pairs of ports may be adjusted at will without interfering with the simultaneous operation of the valve members in opening and closing said ports.

The invention has been made especially with the idea of providing a valve suitable for supplying an explosive mixture of a fuel gas and air or other combustion supporting gas, and whereby the volume of the mixture supplied may be readily varied without changing the relative proportions of the constituent gases in the mixture, and which shall also be adjustable to control the relative proportions of the gases passing through the valve for varying the character of the mixture delivered, or the relative proportions of its constituent gases, or it may be for maintaining the character or proportions of the mixture constant under variations in the relative pressures under which the gases reach the valve.

A principal object of the present invention is to effect the described desired results by means of a novel valve mechanism, simple in structure but convenient, accurate and dependable in operation.

A prominent characteristic of the invention is the provision of a mixing valve in which the desired flexibility of mixture control is fully secured, while leakage of one of the fluids to be mixed, a fuel gas for example, is particularly guarded against and prevented.

A rotary valve embodying the principles of the present invention is illustrated in the accompanying drawings, in which;

Figure 1 is a longitudinal section of the valve, parts being shown in elevation; Fig. 2 is a section through a valve coupling member on line 2—2 of Fig. 1; Figs. 3 and 4 are cross sections on lines 3—3 and 4—4, respectively, of Fig. 1, with the valve plugs in a different position; Fig. 5 is a view similar to Fig. 1, but showing a modified or alternative construction.

Referring to the drawings, and first to Figs. 1 to 4, the valve shown has been made especially for use in mixing and proportioning fuel gas and air and will be considered as a valve for such purpose in the following description. The valve comprises a casing or housing 10 provided with gas inlet and outlet ports 11 and 12, respectively, and air inlet and outlet ports 13 and 14, respectively. The gas intake port opens from an internally threaded flanged recess 15 which provides means for ready attachment of a suitable connection to any convenient source of gas supply, which may be under pressure. A similar flanged recess 16 on the opposite side of the casing into which the gas outlet port opens may be closed at its outer end by a removable threaded plug 17, provided for a purpose to be hereinafter explained. Another internally threaded flanged recess 18 provides for the attachment of means for connecting the air inlet port with a supply of air, which may also be under pressure; and an opposite flanged recess 19 into which the air outlet or discharge port opens and into which a passage 20 also opens affording communication between the gas and air outlet ports, provides for the attachment of means for conducting mixed gas and air to a place of use. The valve casing is provided with a longitudinal bore, conical in the vicinity of the gas ports to provide a gas tight seat for a tapered or conical valve plug or block 25, and cylindrical in the vicinity of the air ports to accommodate a cylindrical valve plug or block 26 having a close sliding fit therewith. Between its conical and cylindrical portions, the bore is for convenience in making somewhat enlarged. One of the valve plugs, the conical plug as shown, has its inner end, or a projection therefrom, provided with a diametral slot or recess which receives with a close sliding fit a projection or tongue 27 extending from the cylindrical plug. Such coupling means prevents relative rotation of the valve plugs, while permitting relative endwise or longitudinal movement of the plugs within limits. The two valve plugs may therefore be said to constitute a compound valve plug or block having adjustably coupled parts. Extending through the conical plug, is a port or channel 30 which is arranged to register simultaneously with and connect the inlet and outlet gas ports of the casing when the valve plug is turned into proper position. Similarly, a port or channel 31 extends through the cylindrical plug and is arranged to register simultaneously with and connect the air ports of the casing. In order that the gas and air ports shall be opened simultaneously by the turning of the compound valve plug, and that continued turning of the valve plug shall result in a uniform proportionate increase in the flow of gas and air through the respective ports and channels, the ports are, in the construction shown in the drawing, made rectangular in cross-section and set with the inlet ports and the outlet ports in longitudinal alinement, and the plug channels or passages 30 and 31 are of the same shape and dimensions in cross-section as the ports with which they coact and are arranged in longitudinal alinement and parallel with each other. Obviously, however, the ports and channels might be otherwise arranged or of other suitable shape. The dimensions of the ports and channels longitudinally of the valve, and consequently their capacities, are different, the air ports and channel being longer. Where the valve is to be used for mixing a fuel gas and air, as in the present instance, this should ordinarily be the case; that is, the air ports should have the greater maximum capacity. The conical valve plug 25 which has no endwise movement but only a turning movement, is constantly pressed against its seat by a spring 32 which surrounds the valve stem 33 and is held compressed between the end of the valve casing and a threaded thrust collar 34 screwed on to the valve stem. This insures a tight joint and prevents leakage of gas. A valve operating handle 35 serves for turning the compound valve plug to open and close the ports. The cylindrical valve plug 26, besides being rotatable, may be moved longitudinally to vary the effective area of the air ports; and to this end there is provided a screw threaded rod 36 having a swivel connection to the cylindrical plug and working in the threaded hub of a cap 37 forming the head of the valve casing. By turning this rod, as by means of an adjusting handle 38, the cylindrical plug or portion of the compound valve plug may be adjusted longitudinally as desired. A lock nut 39 serves to lock the rod 36 to hold the valve plug against longitudinal movement when the proper adjustment has been attained. Slight leakage of air around the cylindrical plug does no special harm, but leakage of gas is to be avoided. This is why a coned plug and valve seat with a fixed effective port area for given angular positions of the valve plug are employed for controlling the gas; while the effective area of the air ports for given angular positions of the valve plug may be varied between zero and a maximum to give the proper proportioning of the mixture. In other words, the arrangement is such that the coned plug, and hence passage 30, is maintained in fixed longitudinal relation to ports 11 and 12; while the longitudinal relation of passage 31 to ports 13 and 14 is capable of being changed to vary proportionately for all positions of the valve the effective capacity of the ports 13 and 14. Since the gas port area is fixed, the air ports and channel should be so designed that the maximum effective air port area obtainable shall be amply sufficient to supply the amount of air required for the leanest mixture which the valve is likely to be called upon to provide. In the position of the air plug shown in Fig. 1, the valve is set to give the leanest mixture of which it is capable at given air and gas pressures.

In using the valve, the air and gas inlet or admission ports being connected to suitable sources of supply of air and gas under suitable pressure and the plug or stopper 17 being in place and the desired connection having been made from the recess or chamber 19, when it is desired to open the valve, the compound valve plug is turned by means of the operating handle 35 to bring the channels or passages 30 and 31 in communication with their respective ports. A flow of gas and air then follows in proportions determined by the relative capacities of the gas and air ports according to the adjustment of the cylindrical plug 26, the gas flowing through the passage 20 to join the air in the recess or chamber 19, from which the mixed gas and air are then discharged. The gas and air ports, as is apparent from Figs. 3 and 4, open simultaneously and are always opened to the same angular extent. Figs. 3 and 4 show the valve part way open. Further turning of the valve plug will give an increased volume of flow without changing the relative proportions of the gas and air or other fluids in the mixture delivered. To change the proportions of the two fluids in the mixture, the lock nut 39 is loosened and by turning the screw rod 36 the cylindrical plug 26 is moved longitudinally within the casing either toward or away from the conical plug to widen or narrow longitudinally the air ports 13 and 14 in the construction shown, thereby increasing or reducing the effective port area for any given angular position of the valve plug and correspondingly increasing or decreasing the proportionate amount of air passing through the valve and into the mixture. Either one of the ports 13 or 14 might obviously be made to serve alone as the controlling or measuring port by making it smaller than the other one. In Fig. 1 the cylindrical air plug 26 is shown in its position of longitudinal adjustment for supplying the greatest proportionate amount of air in the mixture of which the valve is capable, and the adjusting movement of this plug from this position would be a movement to the right or away from the conical plug for reducing the proportionate flow of air. It will be noted that the endwise adjustment of the cylindrical plug does not interfere in any way with either subsequent or simultaneous turning of the compound plug, or adjustment for volume; and that, on the other hand, for any given adjustment of the valve for proportions, the volume of mixture delivered may be increased or decreased simply by turning the valve plug by means of the operating handle 35 without varying the relative proportions of gas and air in the mixture delivered. The lock nut 39 provides means for setting the valve for any desired endwise adjustment of the cylindrical valve plug.

If it is desired to deliver the gas and air, or other dissimilar fluids, separately from the valve, the stopper plug 17 may be removed and the passage 20 closed by inserting a suitable plug or stopper therein (not shown), or otherwise. The passage 20 might, of course, be omitted altogether and the gas and air always discharged through separate conduits from the valve to be afterward intermingled or otherwise treated or employed as desired. The arrangement shown, or other suitable arrangement for discharging the gas and air through the same conduit is, however, convenient when the valve is to be used as a mixing valve.

In Fig. 5, I have shown a valve embodying some features of the invention, and whereby the proportionate amount of air passing through the valve is varied, not by adjustment of a valve member or portion having a fixed channel or passage as in the valve of Fig. 1, but by varying the size or capacity of the air channel or passage of the valve block. In the valve shown in this figure, the cylindrical portion 26ª of the valve block or plug is or may be made integral with the coned part 25 thereof since it is in fixed relation thereto. The channel or passage 31ª for coacting with the ports 13 and 14 is formed by a slot or recess into which extends with a close sliding fit a projection or tongue 40 which is adjustable longitudinally to vary the longitudinal dimension of the passage 31ª and thereby vary proportionately for all open positions of the valve plug the effective area of the ports 13 and 14 relatively to that of the ports 11 and 12. For better guiding the tongue 40, which extends the full width of the cylindrical part of the valve plug, it is formed with or extends from a cylindrical block or head 41 fitted to slide within the cylindrical portion of the valve casing beyond the valve plug. The adjusting screw 36 has a swivel connection with this block or head 41, so that by turning the screw the tongue may be moved to increase or decrease the size or capacity of the passage 31ª and thereby change the proportionate amounts of the two fluids passing through the valve as desired. Since it is the ends of the channel or passage 31ª at the surface of the plug which coöperate with the ports 13 and 14 to control the amount of flow through the ports and channel, it is the size, shape and location of the open ends of the channel which are of importance to be considered and not the size of the intermediate portions of the channel so long as the flow capacity of the channel between its ends is at least equal to the flow capacity of the ports for any position of adjustment of the valve plug and of the tongue 40. The valve shown in this figure is otherwise substantially the same as the valve shown in Fig. 1 except that it has no connecting passage such as the passage 20, or other means, for discharging the two fluids through the same conduit.

What is claimed is:

1. A proportioning valve comprising valve seat forming means having a plurality of ports therein for the separate passage of different fluids, valve forming means seated against said seat forming means, operating means for moving said valve forming means to open and close said ports, and adjusting means for causing a relative movement between different portions of one of the two first said means to vary proportionately for all open positions of said valve forming means the relative effective area of said ports.

2. A proportioning valve comprising valve seat forming means having a plurality of ports therein for the separate passage of different fluids, valve forming means seated against said seat forming means, operating means for moving said valve forming means to simultaneously and proportionately open said ports, and adjusting means for causing a relative movement between different portions of one of the two first said means in a direction transverse to the opening movement of said valve forming means to vary proportionately for all open positions of said valve forming means the relative effective area of said ports.

3. A proportioning valve comprising valve seat forming means having a plurality of ports therein for the separate passage of different fluids, valve forming means seated against said seat forming means, operating means for moving said valve forming means to simultaneously and proportionately open said ports, and adjusting means for causing a relative movement between portions of said valve forming means in a direction transverse to the opening movement thereof to vary proportionately for all open positions of said valve forming means the relative effective area of said ports.

4. A proportioning valve comprising valve seat forming means having a plurality of ports therein for the separate passage of different fluids, a compound valve block having adjustably coupled parts seated against said seat forming means, different parts of the valve block controlling different ports of the valve seat forming means, operating means for moving said valve block to simultaneously and proportionately open said ports, and adjusting means for causing a relative movement between the parts of said valve block in a direction transverse to the opening movement of said valve block to vary the relative effective area of said ports.

5. A proportioning valve comprising valve seat forming means having a plurality of ports therein for the separate passage of different fluids, a tapered valve block seated against said seat forming means and movable in one direction to control one of said ports, a valve block seated against said seat forming means to control another of said ports and movable in two directions, operating means for moving said valve blocks together to simultaneously and proportionately open said two ports, and adjusting means for moving the second said valve block in a direction transverse to the opening movement of said blocks to vary the relative effective area of said ports.

6. A proportioning valve comprising a valve body provided with a plurality of pairs of ports, a plurality of valve blocks each controlling a pair of ports and having a channel for connecting the ports of such pair, and connecting means for preventing relative movement between said blocks in the direction of the opening movements thereof, one of said blocks being adjustable relatively to another in a direction transverse to the opening movement of the blocks to vary the relative effective area of the ports controlled thereby.

7. A proportioning valve comprising a valve body provided with a plurality of ports for the separate passage of different fluids therethrough, and a plurality of valve members for controlling said ports, one of said valve members being held against movement transversely of the direction of its opening and closing movements, and another of said valve members being adjustable transversely of the direction of its opening and closing movements to vary proportionately for all open positions of said valve member the effective area of a port controlled thereby.

8. A proportioning valve comprising a valve body provided with a plurality of ports for the separate passage of different fluids therethrough, a plurality of valve members for controlling said ports, one of said valve members being held against movement transversely of the direction of its opening and closing movements, and another of said valve members being adjustable transversely of the direction of its opening and closing movements to vary proportionately for all open positions of said valve member the effective area of a port controlled thereby, and means for causing the opening and closing movements of said valve members to be proportional.

9. A proportioning valve comprising a valve body provided with a plurality of ports for the separate passage of different fluids therethrough, a plurality of valve members for controlling said ports, one of said valve members being held against movement transversely of the direction of its opening and closing movements, and another of said valve members being adjusable transversely of the direction of its opening and closing movements to vary proportionately for all open positions of said valve member the effective area of a port controlled thereby, and means for preventing relative movement of said valve members in the direction of their opening and closing movements.

10. A proportioning valve comprising a valve body provided with ports for the separate passage of different fluids therethrough, valve members controlling said ports, means connecting said valve members in such manner as to compel simultaneous operation thereof in opening and closing said ports, while permitting adjustment of one valve member relatively to another for varying proportionately for all open positions of the valve members the effective area of a port controlled thereby, and means for operating said valve members.

11. A proportioning valve comprising a valve body provided with ports for the separate passage of different fluids therethrough, valve members controlling said ports, operating means for moving said valve members together relatively to their respective ports to simultaneously and proportionately open said ports, and adjusting means for moving one of said valve members relatively to another to vary the effective area of a port controlled thereby.

12. A proportioning valve comprising a ported conical valve seat and a ported cylindrical valve seat, a coned valve plug seated to rotate against the conical valve seat, a cylindrical valve plug seated to rotate against the cylindrical valve seat and adjustable longitudinally, and operating means for rotating said plugs together relatively to their respective seats to simultaneously and proportionately open ports in the respective valve seats.

13. A proportioning valve comprising a valve casing formed to provide a conical valve seat and a cylindrical valve seat in axial alinement, said valve seats having ports therein, a coned valve plug seated within the conical seat, a cylindrical valve plug seated within the cylindrical valve seat and adjustable longitudinally, and operating means for rotating said plugs together relatively to their respective seats to simultaneously and proportionately open said ports.

14. A proportioning valve comprising a valve casing formed to provide a conical valve seat and a cylindrical valve seat in axial alinement, said valve seats having ports therein, a coned valve plug seated within the conical valve seat, a cylindrical valve plug seated within the cylindrical valve seat and adjustable longitudinally, coupling means connecting the adjacent ends of said plugs formed to prevent relative rotation of the plugs and to permit longitudinal movement of the cylindrical plug relatively to the conical plug, means for rotating said plugs, and adjusting means for controlling the longitudinal position of the cylindrical plug.

15. A proportioning valve comprising a valve casing provided with ports arranged in pairs, a coned valve plug seated within said casing and provided with a transverse channel arranged to register with and connect a pair of ports when the plug is rotated, a cylindrical valve plug also seated within said casing and provided with a transverse channel arranged to register with and connect another pair of ports, said plugs being in axial alinement, coupling means connecting said plugs formed to prevent relative rotation thereof but to permit the cylindrical plug to be moved longitudinally, means for rotating said plugs, and adjusting means for controlling the longitudinal position of the cylindrical plug.

16. A proportioning valve comprising a valve casing provided with ports arranged in pairs, a coned valve plug seated within said casing and provided with a channel arranged to register with and connect a pair of ports when the plug is rotated, a cylindrical valve plug also seated within said casing and adjustable longitudinally and provided with a channel arranged to register with and connect another pair of ports, a passage connecting a port of one pair with a port of another pair, and operating means for rotating said plugs together to simultaneously and proportionately open said pairs of ports.

17. A proportioning valve comprising a valve body provided with ports arranged in pairs, rotatable valve plugs each having a transverse channel arranged upon suitable rotation of the plug to register with and connect a pair of said ports, the channels of different plugs coacting with different pairs of ports, means for preventing relative rotation of said plugs, adjusting means for causing a relative endwise movement between said plugs, and means for rotating said plugs.

18. A proportioning valve comprising a valve casing provided with ports arranged in pairs, alined rotatable valve plugs each having a transverse channel arranged upon suitable rotation of the plug to register with and connect a pair of said ports, the channels of different plugs coacting with different pairs of ports, coupling means connecting said plugs and formed to prevent relative rotation thereof but to permit relative longitudinal movement thereof, means for adjusting the relative longitudinal positions of said plugs, and means for rotating said plugs.

19. A proportioning valve comprising a valve casing provided with ports arranged in pairs, a rotatable coned valve plug seated within said casing and provided with a transverse channel arranged upon rotation of the plug to place a pair of ports controlled thereby in communication, a cylindrical valve plug also seated within said casing and adjustable longitudinally and provided with a transverse channel arranged upon rotation of the plug to register with and connect another pair of said ports, coupling means connecting the adjacent ends of said plugs formed to prevent relative rotation thereof but to permit longitudinal movement of the cylindrical plug, an adjusting screw having a swivel connection to the free end of the cylindrical plug for moving the same longitudinally, and operating means connected to the coned valve plug for rotating both valve plugs.

20. A proportioning valve comprising valve seat forming means having a plurality of ports therein for the separate passage of different fluids, a valve seated against said seat forming means and comprising relatively adjustable parts, operating means for moving said valve to open and close said ports, and adjusting means for causing a relative movement between said relatively adjustable parts of the valve to vary proportionately for all open positions of the valve the relative effective area of said ports.

21. A proportioning valve comprising valve seat forming means having a plurality of ports therein for the separate passage of different fluids, a tapered valve block seated against said seat forming means and movable in one direction to control one of said ports, a valve block seated against said seat forming means to control another of said ports, operating means for moving said valve blocks together to simultaneously and proportionately open said ports, and adjusting means for varying proportionately for all open positions of the valve blocks the effective area of the port controlled by the second said valve block relatively to that of the port controlled by said tapered valve block.

22. A proportioning valve comprising a valve casing formed to provide a conical valve seat and a cylindrical valve seat in axial alinement, said valve seats having ports therein, a coned valve plug seated within the conical seat, a cylindrical valve plug seated within the cylindrical valve seat, operating means for rotating said plugs together to simultaneously and proportionately open said ports, and adjusting means for varying proportionately for all open positions of the valve plugs the effective area of a port controlled by the cylindrical plug relatively to that of a port controlled by the coned plug.

In testimony whereof I have hereunto set my hand in the presence of two subscribing witnesses.

FRANK CREELMAN.

Witnesses:
EUGENE T. HARTIGAN,
A. L. KENT.